US009552971B2

United States Patent
Kovarik

(10) Patent No.: US 9,552,971 B2
(45) Date of Patent: Jan. 24, 2017

(54) BUBBLE REMOVAL FROM LIQUID FLOW INTO A MASS SPECTROMETER SOURCE

(71) Applicant: DH Technologies Development PTE Ltd., Singapore (SG)

(72) Inventor: Peter Kovarik, Markham (CA)

(73) Assignee: DH Technologies Development Pte. Ltd., Singapore (SG)

( * ) Notice: Subject to any disclaimer, the term of this patent is extended or adjusted under 35 U.S.C. 154(b) by 0 days.

(21) Appl. No.: 14/910,044

(22) PCT Filed: Aug. 5, 2014

(86) PCT No.: PCT/IB2014/001470
§ 371 (c)(1),
(2) Date: Feb. 4, 2016

(87) PCT Pub. No.: WO2015/019159
PCT Pub. Date: Feb. 12, 2015

(65) Prior Publication Data
US 2016/0181078 A1  Jun. 23, 2016

Related U.S. Application Data

(60) Provisional application No. 61/863,312, filed on Aug. 7, 2013.

(51) Int. Cl.
*H01J 49/00* (2006.01)
*H01J 49/04* (2006.01)
*H01J 49/16* (2006.01)

(52) U.S. Cl.
CPC ........ *H01J 49/0445* (2013.01); *H01J 49/0431* (2013.01); *H01J 49/16* (2013.01)

(58) Field of Classification Search
None
See application file for complete search history.

(56) References Cited

U.S. PATENT DOCUMENTS

| 3,310,356 | A | * | 3/1967 | Borberg | G02B 27/0006 359/509 |
| 6,054,709 | A | * | 4/2000 | Douglas | H01J 49/0431 250/282 |
| 6,310,356 | B1 | * | 10/2001 | Yuhara | B01D 19/0068 250/574 |
| 8,759,753 | B1 | * | 6/2014 | Di Bussolo | B01D 15/325 210/198.2 |

(Continued)

FOREIGN PATENT DOCUMENTS

| JP | 11-317192 A | 11/1999 |
| JP | 11317192 A | * 11/1999 |

(Continued)

OTHER PUBLICATIONS

International Search Report and Written Opinion for PCT/IB2014/001470 mailed Dec. 2, 2014.

*Primary Examiner* — Andrew Smyth

(57) ABSTRACT

Methods and systems for delivering a liquid sample to an ion source are provided herein. In various aspects, the methods and systems can improve the stability of a flow of liquid sample delivered to an ion source. In accordance with various aspects, the methods and systems can remove bubbles (e.g., cavitation bubbles or otherwise) present in the liquid sample prior to its injection into an ionization chamber.

20 Claims, 3 Drawing Sheets

(56) References Cited

U.S. PATENT DOCUMENTS

| | | | |
|---|---|---|---|
| 2005/0236565 A1* | 10/2005 | Oser | H01J 49/162 |
| | | | 250/288 |
| 2010/0186524 A1* | 7/2010 | Ariessohn | G01N 1/2202 |
| | | | 73/863.22 |
| 2010/0193702 A1* | 8/2010 | Li | H01J 49/165 |
| | | | 250/424 |
| 2010/0276584 A1* | 11/2010 | Splendore | H01J 49/0404 |
| | | | 250/282 |
| 2011/0278214 A1* | 11/2011 | Benevides | B01D 15/22 |
| | | | 210/198.2 |
| 2012/0199732 A1* | 8/2012 | Chetwani | H01J 49/165 |
| | | | 250/282 |
| 2013/0134095 A1* | 5/2013 | Anderer | B01D 15/1878 |
| | | | 210/656 |
| 2013/0243412 A1* | 9/2013 | Nakano | G01N 30/7246 |
| | | | 392/485 |

FOREIGN PATENT DOCUMENTS

| | | | | |
|---|---|---|---|---|
| JP | 2009-500602 A | | 1/2009 | |
| SG | WO 2015019159 A1 * | | 2/2015 | H01J 49/0431 |

* cited by examiner

BUBBLE REMOVAL FROM LIQUID FLOW INTO A MASS SPECTROMETER SOURCE

RELATED APPLICATION

This application claims priority to U.S. provisional application No. 61/863,312, filed Aug. 7, 2013, which is incorporated herein by reference in its entirety.

FIELD

The present teachings generally relate to mass spectrometry, and more particularly and without limitation, to methods and apparatus for delivering a liquid sample to an ion source.

INTRODUCTION

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Due to the accuracy and sensitivity requirements for most MS applications, liquid samples must generally be delivered to an ion source using highly accurate and precise pumping mechanisms that generate a stable ion signal in a downstream mass analyzer. Syringe pumps, for example, are highly tunable, while providing a precise, accurate, smooth, pulse-less flow. They are also expensive.

Though rapidly reciprocating pumps, for example, could provide an inexpensive, efficient means of moving liquid at moderate pressures, their use for delivering liquid samples to an ion source is limited by the stability of the signal derived from the generated flow. Indeed, most relatively low cost pumping mechanisms are only capable of generating fluid flows exhibiting some, but not all, of the characteristics desirable to obtain a stable ion signal. One particular example of a rapidly reciprocating pump is a diaphragm pump, in which a reciprocating elastic membrane changes the volume of the pump cavity, and in combination with one or more check valves, generates a liquid flow. The diaphragm pump's simple design lends itself well to be manufactured from chemically inert materials and provides a low risk of contamination. They are tolerant of running dry and offer self-priming capabilities as well as operation over a wide range of viscosities. Despite these potential benefits, rapidly reciprocating pumps are generally not suitable for mass spectrometry applications due to the instability of the generated fluid flow. Though pulses in the fluid flow due to the alternating compression/tension cycles can be mitigated with pressure accumulators and dampeners (these pumps are reciprocated with a rapid pump cycle to mask a re-stroke gap in their flow), the rapid oscillation can also cause the formation of cavitation bubbles. For example, when the tensile stress caused by a retracting membrane overcomes the tensile strength of the liquid, pressure within the liquid drops below its saturated vapor pressure such that bubbles are generated as the liquid changes into its gas phase. These bubbles can introduce disruption to the ion generation process at the spray tip and compromise the signal stability.

Accordingly, there remains a need for improved and/or reduced-cost systems, methods, and devices for delivering a liquid sample to an ion source.

SUMMARY

Methods and systems for delivering a liquid sample to an ion source for the generation of ions and subsequent analysis by mass spectrometry are provided herein. In accordance with various aspects of the applicant's teachings, the methods and systems can be effective to improve the stability of a flow of liquid sample delivered to an ion source by removing bubbles (e.g., pockets of gas enclosed by liquid) from the liquid sample prior to its injection into an ionization chamber. In various aspects, the methods and systems provided herein can improve the stability of the sample flow to enable the use of various pumps, previously believed unsuitable for mass spectrometry.

In accordance with various aspects, certain embodiments of the applicant's teachings relate to an apparatus for generating ions for analysis by a mass spectrometer that includes an ion source housing defining an ion source chamber, the ion source chamber configured to be in fluid communication with a sampling orifice of a mass spectrometer; an inlet conduit having an inlet end for receiving a liquid sample from a sample source; a return conduit for receiving a first portion of the liquid sample from the inlet conduit; and an outlet conduit (e.g., capillary tube) for receiving a second portion of the liquid sample from the inlet conduit, the outlet conduit having an outlet end for discharging the second portion of the liquid sample into the ion source chamber, wherein bubbles contained within the liquid sample in the inlet conduit are preferentially diverted to the return conduit relative to the outlet conduit. For example, more than 50%, more than 60%, more than 70%, more than 80%, more than 90%, more than 95% of bubbles in the inlet conduit can be diverted to the return conduit. In one embodiment, more than 90% of bubbles in the inlet conduit can be diverted to the return conduit.

In various aspects, the return conduit can transport the first portion of the liquid sample to the sample source. By way of example, the sample source can comprise a reservoir.

The inlet, return, and outlet conduits can have a variety of configurations so as to preferentially divert bubbles contained within the liquid sample from being directed to the ion source chamber. In accordance with various aspects, for example, the volumetric flow rate of liquid sample in the inlet conduit can be substantially equal (e.g., within ±5%) to a volumetric flow rate in the return conduit plus a volumetric flow rate in the outlet conduit. In a related aspect, the volumetric flow rate in the return conduit can be greater than the volumetric flow rate in the outlet conduit. By way of example, the ratio of the volumetric flow rate in the return conduit to the volumetric flow rate in the outlet conduit can be greater than about 5 (e.g., greater than about 10, greater than about 20). In various aspects, the volumetric flow rate of liquid sample in the inlet conduit is greater than about 1 mL/min (e.g., greater than about 5 mL/min, about 10 mL/min). Additionally or alternatively, the volumetric flow rate of liquid sample in the outlet conduit can be greater than about 5 µL/min (e.g., greater than about 20 µL/min, about 50 µL/min, about 100 µL/min).

In some aspects, the inlet conduit terminates in a junction from which an inlet of each of the return conduit and the outlet conduit extend. For example, the inlet of the return conduit can be disposed above the inlet of the outlet conduit. In some aspects, the size of the return conduits and outlet conduits can differ. For example, the ratio of the inner diameter of the inlet of the return conduit to the inlet of the outlet conduit is greater than about 3. In some aspects, the ratio of the cross-sectional area of the inlet of the return conduit to the inlet of the outlet conduit can be greater than about 10. In some aspects, the outlet conduit can comprise a capillary tube.

In various aspects of the present teachings, the system can additionally include a pump for transporting the liquid sample through the inlet conduit. For example, the pump can be a fast reciprocating pump or diaphragm pump.

In accordance with various aspects, certain embodiments of the applicant's teachings relate to a method of generating ions for analysis by a mass spectrometer that comprises receiving a liquid sample at an inlet end of an inlet conduit from a sample source; delivering a first portion of the liquid sample received by the inlet conduit to a return conduit and a second portion of the liquid sample received by the inlet conduit to an outlet conduit; and discharging the second portion of the liquid sample from an outlet end of the outlet conduit to an ion source chamber such that the discharged liquid forms a sample plume directed towards a sampling orifice of a mass spectrometer. In various aspects, the bubbles contained within the liquid sample in the inlet conduit are preferentially diverted to the first portion relative to the second portion.

In some aspects, the method can also include transporting the first portion of the liquid sample from the return conduit to the sample source (e.g., a reservoir).

In accordance with various aspects, the volumetric flow rate of liquid sample in the inlet conduit is substantially equal to a volumetric flow rate in the return conduit plus the volumetric flow rate in the outlet conduit. Additionally, in some aspects, the ratio of the volumetric flow rate in the return conduit to the volumetric flow rate in the outlet conduit is greater than about 5 (e.g., greater than about 10). In various aspects, the method can further comprise utilizing a fast reciprocating pump to pump said liquid sample from the sample source to the inlet conduit.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

In accordance with various aspects of the applicant's teachings, the methods and systems described herein can improve the stability of a flow of liquid sample delivered to an ion source for the generation of ions and subsequent analysis by mass spectrometry are provided herein. In accordance with various aspects, the methods and systems can remove bubbles (e.g., cavitation bubbles or otherwise) present in a liquid sample prior to its injection into an ionization chamber. Moreover, exemplary embodiments in accord with various aspects of the present teachings utilize pumping mechanisms, which were previously believed unsuitable for mass spectrometry, to reliably deliver a liquid sample from a sample source to the ion source.

Figure 1:
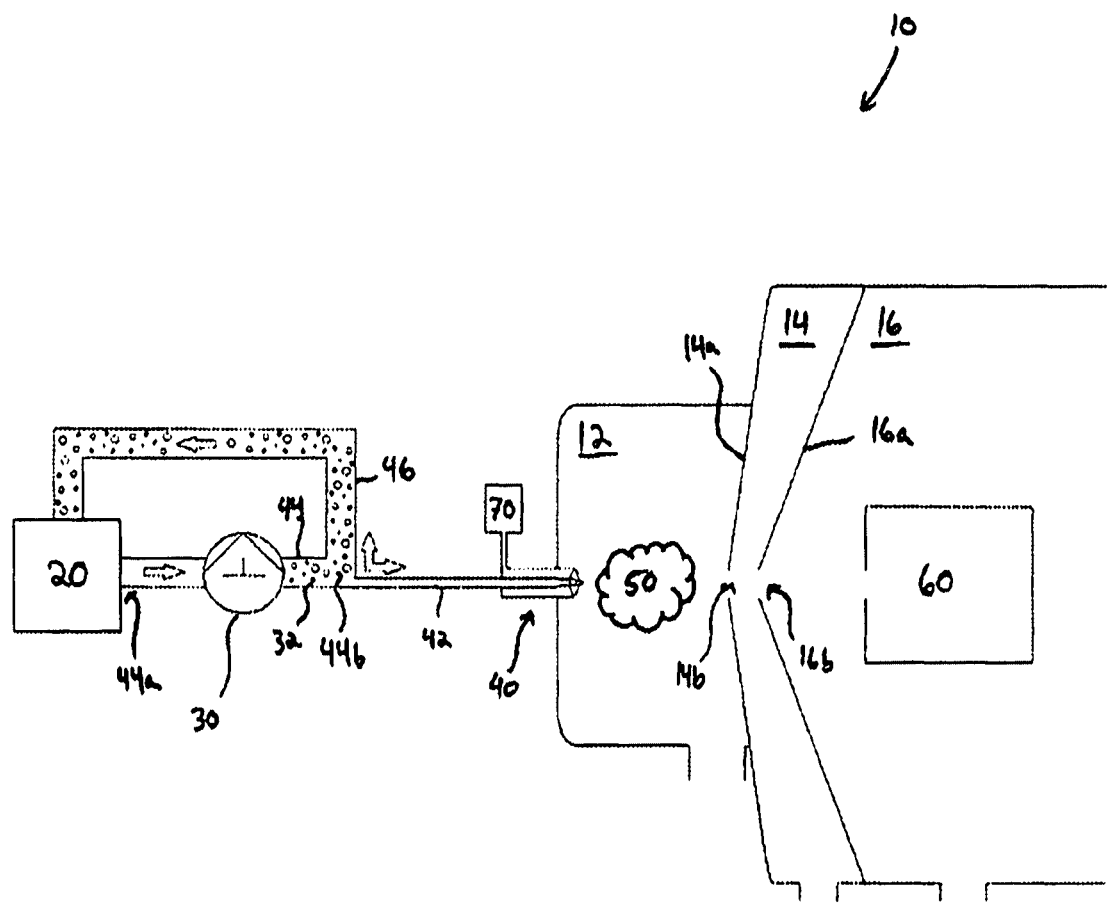
FIG. 1, in a schematic diagram, illustrates an exemplary mass spectrometry system for generating sample ions from a liquid sample in accordance with various aspects of the applicant's teachings.

FIG. 1 schematically depicts an exemplary embodiment of a mass spectrometer system 10 in accordance with various aspects of the applicant's teachings for generating sample ions from a liquid sample and delivering the sample ions to a sampling orifice of a mass spectrometer. As shown in FIG. 1, the mass spectrometer system 10 generally includes a liquid sample source 20, a pump 30, an ion source 40, and a mass analyzer 60 for the downstream processing of sample ions. As will be discussed in more detail below, the pump 30 generally causes at least a portion of the liquid sample received from the sample source 20 to be transported through one or more conduits (e.g., channels, tubing, pipes, capillary tubes, etc.) to the ion source 40, which discharges the liquid sample into an ionization chamber 12. Further, as will be discussed in detail below, the mass spectrometer system 10 can be configured to remove bubbles (e.g., cavitation bubbles or otherwise) present in the liquid sample prior to its injection into the ionization chamber 12.

In the depicted embodiment, the ionization chamber 12 can be maintained at an atmospheric pressure, though in some embodiments, the ionization chamber 12 can be evacuated to a pressure lower than atmospheric pressure. The ionization chamber 12, within which analytes in the liquid sample are ionized, is separated from a gas curtain chamber 14 by a plate 14a having a curtain plate aperture 14b. As shown, a vacuum chamber 16, which houses the mass analyzer 60, is separated from the curtain chamber 14 by a plate 16a having a vacuum chamber sampling orifice 16b. The curtain chamber 14 and vacuum chamber can be maintained at a selected pressure(s) (e.g., the same or different sub-atmospheric pressures, a pressure lower than the ionization chamber) by evacuation through one or more vacuum pump ports 18.

As will be appreciated by a person skilled in the art, the system 10 can be fluidly coupled to and receive a liquid sample from a variety of liquid sample sources. By way of non-limiting example, the sample source 20 can comprise a reservoir of the sample to be analyzed or an input port through which the sample can be injected. Alternatively, also by way of non-limiting example, the liquid sample to be analyzed can be in the form of an eluent from a liquid chromatography column, for example.

The ion source 40 can also have a variety of configurations but is generally configured to generate ions from the liquid sample that it receives from the sample source 20. In the exemplary embodiment depicted in FIG. 1, an outlet conduit 42, which can comprise a capillary, for example, as described in more detail below, terminates in an outlet end 42b that at least partially extends into the ionization chamber 12 and discharges the liquid sample therein. As will be appreciated by a person skilled in the art in light of the present teachings, the outlet end 42b can atomize, aerosolize, nebulize, or otherwise discharge (e.g., spray with a nozzle) the liquid sample into the ionization chamber 12 to form a sample plume 50 comprising a plurality of micro-droplets generally directed toward (e.g., in the vicinity of) the curtain plate aperture 14b and vacuum chamber sampling orifice 16b. As is known in the art, analyte molecules contained within the micro-droplets can be ionized (i.e., charged) by the ion source 40, for example, as the sample plume 50 is generated. By way of non-limiting example, the outlet end 42b can be made of a conductive material and electrically coupled to a pole of a voltage source (not shown), while the other pole of the voltage source can be grounded. Micro-droplets contained within the sample plume 50 can thus be charged by the voltage applied to the outlet end 42b such that as the liquid (e.g., solvent) within the droplets evaporate during desolvation in the ionization chamber 12, bare charged analyte ions are released and drawn toward and through the apertures 14b, 16b and focused (e.g., via one or more ion lens) into the mass analyzer 60. It should be appreciated that any number of different ionization techniques known in the art can be utilized as the ion source 40 in accord with the present teachings. By way of non-limiting example, the ion source 40 can be a electrospray ionization device, a nebulizer assisted electrospray device, a chemical ionization device, a nebulizer assisted atomization device, a photoionization device, a laser ionization device, a thermospray ionization device, or a sonic spray ionization device. In some embodiments, the sample plume can be generated by a liquid stream impinging on a rapidly oscillating surface.

With continued reference to FIG. 1, the mass spectrometer system 10 can optionally include a source 70 of pressurized gas (e.g. nitrogen, air, or noble gas) that supplies a high velocity nebulizing gas flow which surrounds the outlet end 42b of the outlet conduit 42 and interacts with the fluid discharged therefrom to enhance the formation of the sample plume 50 and the ion release within the plume for sampling by 14b and 16b, e.g., via the interaction of the high speed nebulizing flow and jet of liquid sample. The nebulizer gas can be supplied at a variety of flow rates, for example, in a range from about 0.1 L/min to about 20 L/min.

It will also be appreciated by a person skilled in the art and in light of the teachings herein that the mass analyzer 60 can have a variety of configurations. Generally, the mass analyzer 60 is configured to process (e.g., filter, sort, dissociate, detect, etc.) sample ions generated by the ion source 40. By way of non-limiting example, the mass analyzer 60 can be a triple quadrupole mass spectrometer, or any other mass analyzer known in the art and modified in accordance with the teachings herein. The mass analyzer 60 can comprise a detector that can detect the ions which pass through the analyzer 60 and can, for example, supply a signal indicative of the number of ions per second that are detected.

Though the exemplary pump 30 depicted in FIG. 1 comprises a reciprocating pump, pumps for use in the methods and systems described herein can have a variety of configurations and can generally comprise any pump mechanism known in the art and modified in accord with the present teachings that is configured to transport fluid through the conduits and deliver the fluid to the ion source 40. By way of non-limiting example, positive displacement pumps such as rotary, gear, plunger, piston, peristaltic, diaphragm pump, and other pumps such as gravity, impulse and centrifugal pumps can be used to pump liquid sample.

Figure 2:
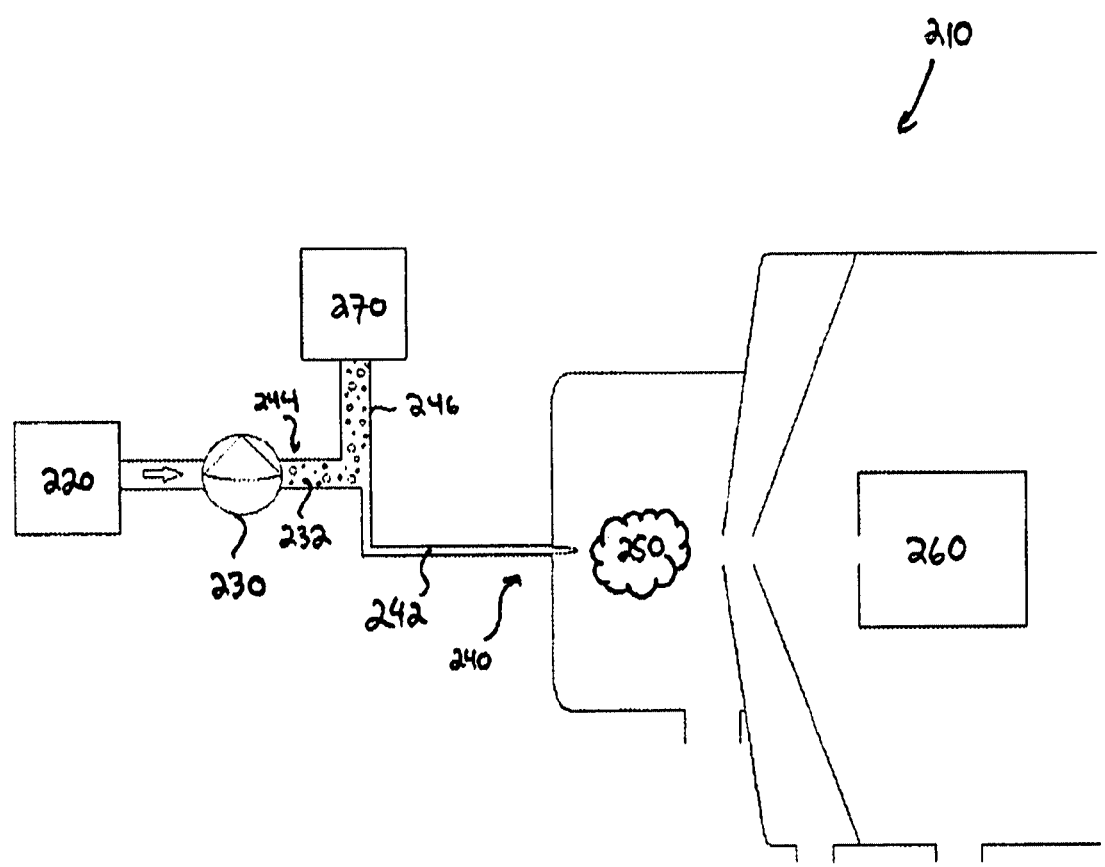
FIG. 2, in a schematic diagram, illustrates another exemplary mass spectrometry system for generating sample ions from a liquid sample in accordance with various aspects of the applicant's teachings.

With reference now to FIG. 2, another exemplary mass spectrometer system 210 in accordance with various aspects of the present teachings is schematically depicted. Mass spectrometer system 210 is substantially similar to that of FIG. 1, but differs in part in that the pump 230 comprises an oscillating diaphragm in fluid communication with the liquid sample. As the diaphragm oscillates, cycles of compression (e.g., positive pressure) and tension (e.g., negative pressure) are exerted on the fluid. In combination with one or more one-way check valves, the diaphragm pump can generate fluid movement from the sample source 230 to the ion source 240. It will be appreciated that the diaphragm pump 230 can be selected to operate at variety of frequencies (e.g., less than about 1000 Hz continuous, about 60 Hz) as well as with pulse width modulation of its power in range of 50 kHz or less to optimize the characteristics of flow (volumetric flow rate, stability of fluid flow, etc.).

As noted above, systems and methods in accord with various aspects of the applicant's teachings are configured to remove bubbles (e.g., cavitation bubbles or otherwise) present in a liquid sample prior to its injection into an ionization chamber. With specific reference to FIG. 1, the exemplary mass spectrometer system 10 comprises one or more conduits through which at least a portion of the liquid sample is transported from the sample source 20 to the outlet end 42b of the outlet conduit 42 disposed within the ionization chamber 12. As shown in FIG. 1, an inlet conduit 44 is fluidly coupled to the sample source 20 and includes an inlet end 44a for receiving (directly or indirectly) liquid sample from the sample source 20. A reciprocating pump 30 is also coupled to the inlet conduit 44 and can be actuated to draw the sample liquid into the inlet conduit 44 for transport therethrough. As discussed above, however, operation of the reciprocating pump 30 can potentially generate bubbles 32 within the sample liquid, e.g., through cavitation. Downstream of the pump 30, the inlet conduit 44 terminates in a junction 44b, from which a return conduit 46 and the outlet conduit 42 extend. Fluid entering the return conduit 46 at the junction 44b is transported back to the sample source 20 (e.g., reservoir), while fluid entering the outlet conduit is delivered to the outlet end 42b for discharge into the ionization chamber 12. However, with reference now to FIG. 2, it will be appreciated that the return conduit can alternatively direct the fluid flowing therethrough to a waste receptacle 270, or one or more other ion source(s) or other mechanism for further processing or collection.

The junction 44b, outlet conduit 42, and return conduit 46 are generally configured such that bubbles 32 contained within the sample fluid in the inlet conduit 44 (e.g., sample liquid and gas bubbles downstream of the pump 30) are preferentially diverted to the return conduit 46, as depicted in FIG. 1, thereby reducing, or preventing, the bubbles 32 from being delivered to the ionization chamber 12 through the outlet conduit 42. For example, bubbles can be diverted to the return conduit 46 such that the sample liquid within the outlet conduit 42 contains less than 10% v/v of bubbles (e.g., less than 5% v/v). By way of non-limiting example, substantially all (e.g., greater than 95%) of the bubbles 32 generated by the pump 30 can be diverted to the return conduit 46. It will further be appreciated by a person skilled in the art in light of the present teachings that, in some aspects, while not all bubbles 32 are diverted to the return conduit 46, enough bubbles 32 can be diverted such that any remaining bubbles do not substantially interfere with the ionization process or cause unresolvable disturbances in the ion signal generated by the mass analyzer 50.

In accordance with the present teachings, the junction 44b, outlet conduit 42, and return conduit 46 can have a variety of configurations such that the bubbles 32 are preferentially diverted to the return conduit 46. By way of example, the inner diameters, cross-sectional areas, average flow rates, and orientation of the inlets to the return and outlet conduits 42, 46 can be selected such that the bubbles 32 are directed towards the return conduit. By way of example, the conduits can be configured such that the bulk (e.g., greater than about 90%, greater than about 95%) of the volumetric fluid flow in the inlet conduit 44 is returned through the return conduit 46 to the sample source 20, while the remainder of the volumetric fluid flow enters the outlet conduit 42 and is transported to the outlet end 42b.

As shown in FIG. 1, for example, the return conduit 46 can be oriented relative to the outlet conduit 42 (e.g., above outlet conduit 42) such that the flow in the return conduit 46 is generally directed against gravitational force while the signal generating flow is aligned with the gravitational force. As a result, the natural tendency of the bubbles 32 to rise in the relatively dense liquid sample will preferentially cause the bubbles to follow the bulk of the fluid flow diverted into the return conduit 46.

It will be appreciated that the orientation of the outlet conduit and return conduit need not be precise, as long as the return conduit 46 and outlet conduit 42 are oriented relative to each other such that the gravitational field favors the flow in the outlet conduit, while impeding the flow in the return conduit 46. Regardless, as shown in FIG. 2, the orientation of the flow in the return conduit can be selected to be directly opposed to the orientation of the flow in the outlet conduit 42 so as to maximize the tendency of the bubbles to flow into the return conduit 246.

The diversion of bubbles from the outlet conduit 42 can alternatively or additionally occur due to the conduits' 42, 46 different inner diameters at the junction 44b, which can accordingly result in differences in the volumetric flow rate through the conduits. For example, in some aspects, the inner diameter of the return conduit 46, and thus its volumetric flow rate, can be greater than that of the outlet conduit 42. In some embodiments, the inner diameter of the inlet of the return conduit 46 can be at least about three times greater than that of the outlet conduit 42. For example, the ratio of the cross-sectional area of the inlet of the return conduit to the inlet of the outlet conduit can be greater than about 10. In some aspects of the present teachings, the ratio of the volumetric flow rate in the return conduit to the volumetric flow rate in the outlet conduit can be greater than about 5 (e.g., greater than about 10, greater than about 20) (this measure can be a more useful metric for conduits having a non-circular cross-sectional areas). Similarly, in various aspects, the volumetric flow rate of liquid sample in the inlet conduit can be greater than about 1 mL/min (e.g., greater than about 5 mL/min, about 10 mL/min). Additionally or alternatively, the volumetric flow rate of the liquid sample in the outlet conduit can be greater than about 5 µL/min (e.g., greater than about 20 µL/min, about 50 µL/min, about 100 µL/min, or even greater).

In various aspects of the present teachings, the smaller inner diameter encountered by the bubbles 32 at the entrance to the outlet conduit 42 can trap and/or slow the bubbles 32 (as their re-shaping requires energy due to their surface tension), therefore helping to prevent the bubbles from flowing into the outlet conduit 42 as they are swept by the higher flow into the buoyancy favored return conduit 46. For example, as the bubbles 32 become trapped in a region (e.g., junction 44b), the bubbles can be preferentially returned to the reservoir 20 due to difference in the inner diameter of the conduits and relative volumetric flow rates, the bubbles natural buoyancy moves them into the return conduit 46. Moreover, systems and methods in accordance with various aspects of the present teachings provide the additional benefit that the larger internal volume of the return conduit can act as a pressure accumulator, thus masking the inherent pulsation of the reciprocating pump 30 while improving the stability of the flow into the outlet conduit and eventually to the ion source 40. Moreover, given the increase in the volumetric flow rate in the inlet conduit 44 (with a portion of that volume being diverted to the return conduit and sample source 20, or otherwise), the operation of the reciprocating pump 30 can be stabilized, and further, allow the use of tubing with larger internal diameters relative to those of the outlet conduit 42.

Examples

Figure 3:
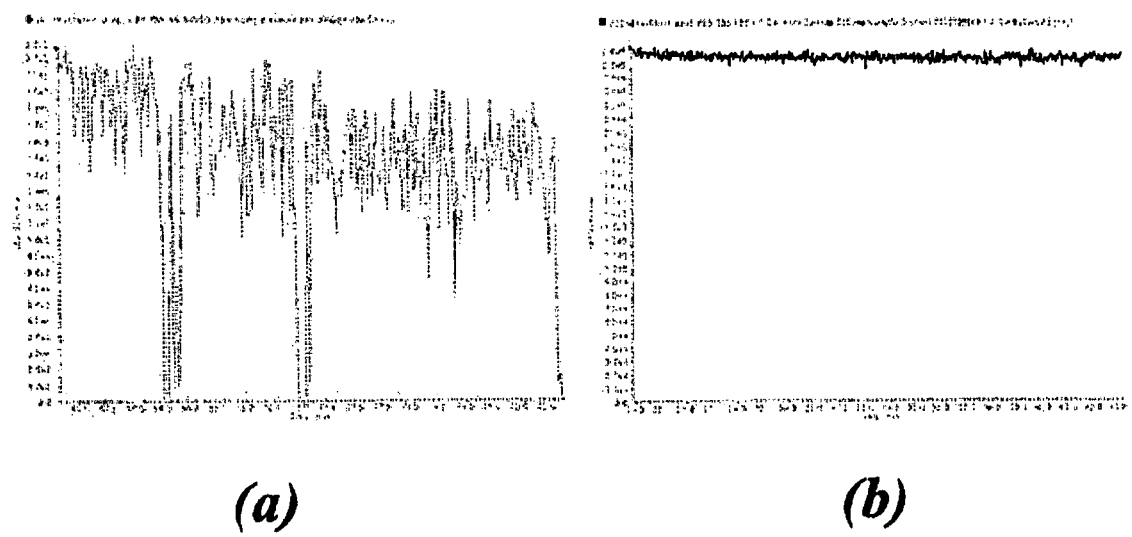
FIG. 3 depicts an ion chromatogram demonstrating the stability of an ion signal generated by an exemplary mass spectrometer system in accordance with various aspects of the applicant's teachings.

With specific reference now to FIG. 3, the exemplary ion chromatograms depict the difference in stability of an ion signal generated with a fast reciprocating pump—without bubble removal (FIG. 3(a)) and an ion signal generated by the same fast reciprocating pump with bubble removal systems and methods in accordance with the present teachings (FIG. 3(b)). Apart from the difference in their respective flow paths, both experiments were carried out under identical conditions: API 4000 QTRAP marketed by AB SCIEX operated in MRM mode for detection of Reserpine (positive ion mode, transition 609 Da to 195 Da) with 1000 msec dwell time. Both tests used a solution with a nominal concentration of 10 pg/µL, but each was from a different batch (hence the slight difference in the average sensitivity). It was prepared in 50/50/0.1% water/methanol/formic acid. A Turbo V esi probe was used to generate the ions under standard settings for the nebulizer gas and desolvation heaters (~1.5 L/min and ~8 L/min respectively). In each experiment, the diaphragm pump was operated at 3000 rpm to pump about 20 mL/min from the sample source, with about 90 µL/min being delivered to the ion source (in the bubble removal set-up (b), the inlet return conduit was generally disposed above the outlet conduit as discussed otherwise herein, rather than a generally planar split as in set-up (a)). The return conduit in the bubble removal set-up had an inner diameter of 2.5 mm and the outlet conduit had an inner diameter of 0.5 mm. At the junction, the return conduit was oriented vertically, while the outlet conduit was oriented horizontally.

As is evident from the figures, the signal in FIG. 3(a) is significantly less stable and is generally unsuitable for calibration or set-up of a mass spectrometer. The ion signal of FIG. 3(b), however, has a CV of about 0.9%, which is comparable to the performance obtained with a new Harvard Apparatus syringe pump.

Accordingly, the systems and methods described herein can be effective to stabilize the flow of sample liquid being delivered to an ion source, thereby producing a more stable ion signal. Though cavitation bubbles generated by a pump could, for example, interfere with the ionization of a sample liquid and the subsequent detection of analyte ions, applicant's present teachings can enable the enhanced delivery of sample liquids utilizing pumps previously believed unsuitable for sample delivery in mass spectrometry.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

What is claimed is:

1. An apparatus for generating ions for analysis by a mass spectrometer, comprising:
    an ion source housing defining an ion source chamber, the ion source chamber configured to be in fluid communication with a sampling orifice of a mass spectrometer;
    an inlet conduit having an inlet end for receiving a liquid sample from a sample source;
    a return conduit for receiving a first portion of the liquid sample from the inlet conduit; and
    an outlet conduit for receiving a second portion of the liquid sample from the inlet conduit, the outlet conduit having an outlet end for discharging the second portion of the liquid sample into the ion source chamber,
    wherein cavitation bubbles contained within the liquid sample in the inlet conduit are diverted to the return conduit relative to the outlet conduit.

2. The apparatus of claim 1, wherein the return conduit transports the first portion of the liquid sample to the sample source.

3. The apparatus of claim 2, wherein the sample source comprises a reservoir.

4. The apparatus of claim 1, wherein a volumetric flow rate of liquid sample in the inlet conduit is substantially equal to a volumetric flow rate in the return conduit plus a volumetric flow rate in the outlet conduit.

5. The apparatus of claim 4, wherein the ratio of the volumetric flow rate in the return conduit to the volumetric flow rate in the outlet conduit is greater than about 10, and optionally
    wherein the ratio of the volumetric flow rate in the return conduit to the volumetric flow rate in the outlet conduit is greater than about 20.

6. The apparatus of claim 1, wherein the inlet conduit terminates in a junction from which an inlet of each of the return conduit and the outlet conduit extend.

7. The apparatus of claim 6, wherein the inlet of the return conduit is disposed above the inlet of the outlet conduit.

8. The apparatus of claim 6, wherein the ratio of the inner diameter of the inlet of the return conduit to the inlet of the outlet conduit is greater than about 3.

9. The apparatus of claim 6, wherein the ratio of the cross-sectional area of the inlet of the return conduit to the inlet of the outlet conduit is greater than about 10.

10. The apparatus of claim 6, wherein the outlet conduit comprises a capillary tube.

11. The apparatus of claim 1, further comprising a pump for transporting the liquid sample through the inlet conduit.

12. The apparatus of claim 11, wherein the pump comprises a fast reciprocating pump, and optionally
    wherein the pump comprises an oscillating diaphragm.

13. The apparatus of claim 1, wherein a volumetric flow rate of liquid sample in the inlet conduit is greater than about 1 mL/min, optionally
    wherein the volumetric flow rate of liquid sample in the inlet conduit is greater than about 5 mL/min, and optionally
    wherein the volumetric flow rate of liquid sample in the inlet conduit is about 10 mL/min.

14. The apparatus of claim 1, wherein a volumetric flow rate of liquid sample in the outlet conduit is greater than 5 µL/min, and optionally
    wherein the volumetric flow rate of liquid sample in the outlet conduit is greater than about 20 µL/min.

15. A method of generating ions for analysis by a mass spectrometer, comprising:
    receiving a liquid sample at an inlet end of an inlet conduit from a sample source;
    delivering a first portion of the liquid sample received by the inlet conduit to a return conduit and a second portion of the liquid sample received by the inlet conduit to an outlet conduit; and
    discharging the second portion of the liquid sample from an outlet end of the outlet conduit to an ion source chamber such that the discharged liquid forms a sample plume directed toward a sampling orifice of a mass spectrometer; and
    wherein cavitation bubbles contained within the liquid sample in the inlet conduit are diverted to the return conduit relative to the outlet conduit.

16. The method of claim 15, further comprising transporting the first portion of the liquid sample from the return conduit to the sample source.

17. The method of claim 16, wherein the sample source comprises a reservoir.

18. The method of claim 15, wherein a volumetric flow rate of liquid sample in the inlet conduit is substantially equal to a volumetric flow rate in the return conduit plus the volumetric flow rate in the outlet conduit.

19. The method of claim 18, wherein the ratio of the volumetric flow rate in the return conduit to the volumetric flow rate in the outlet conduit is greater than about 10.

20. The method of claim 15, further comprising utilizing a fast reciprocating pump to pump said liquid sample from the sample source to the inlet conduit.

* * * * *